US011657064B2

(12) United States Patent
Aboobaker et al.

(10) Patent No.: US 11,657,064 B2
(45) Date of Patent: May 23, 2023

(54) COMPONENTIZED DASHBOARDS

(71) Applicant: Salesforce, Inc., San Francisco, CA (US)

(72) Inventors: Nadeem Marfani Aboobaker, San Francisco, CA (US); Zuye Zheng, San Francisco, CA (US); Vaibhav Garg, San Francisco, CA (US); Niranjan Yadavali, San Francisco, CA (US); Khushboo Shah, San Mateo, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/124,250

(22) Filed: Dec. 16, 2020

(65) Prior Publication Data
US 2022/0188327 A1    Jun. 16, 2022

(51) Int. Cl.
*G06F 16/26* (2019.01)
*G06F 9/451* (2018.01)
*G06F 16/248* (2019.01)
*G06F 16/25* (2019.01)
G06F 3/0485 (2022.01)

(52) U.S. Cl.
CPC .............. *G06F 16/26* (2019.01); *G06F 9/451* (2018.02); *G06F 16/248* (2019.01); *G06F 16/252* (2019.01); *G06F 3/0485* (2013.01)

(58) Field of Classification Search
CPC ........ G06F 16/26; G06F 9/451; G06F 16/248; G06F 16/252; G06F 3/0485
See application file for complete search history.

(56) References Cited

U.S. PATENT DOCUMENTS

| | | | |
|---|---|---|---|
| 8,549,359 B2 | 10/2013 | Zheng | |
| 8,589,348 B2 | 11/2013 | Tobin et al. | |
| 8,688,640 B2 | 4/2014 | Tobin et al. | |
| 8,726,240 B2 | 5/2014 | Gallagher et al. | |
| 8,745,625 B2 | 6/2014 | Tobin et al. | |
| 8,752,017 B2 | 6/2014 | Hossain et al. | |
| 8,756,588 B2 | 6/2014 | Zheng et al. | |
| 8,818,938 B2 | 8/2014 | Maya et al. | |
| 8,839,209 B2 | 9/2014 | Gallagher et al. | |
| 8,881,113 B2 | 11/2014 | Zheng et al. | |
| 8,930,327 B2 | 1/2015 | Hossain et al. | |
| 8,972,439 B2 | 3/2015 | Mathew et al. | |
| 9,189,532 B2 | 11/2015 | Tobin et al. | |
| 9,201,760 B2 | 12/2015 | Zheng | |
| 9,678,935 B2 | 6/2017 | Lu et al. | |
| 10,121,110 B2 | 11/2018 | Tobin et al. | |
| 10,296,630 B2 | 5/2019 | Zheng et al. | |

(Continued)

Primary Examiner — Andrey Belousov
(74) Attorney, Agent, or Firm — Polygon IP, LLP

(57) ABSTRACT

Described herein are systems, apparatus, methods and computer program products configured for componentized dashboards for data visualization. In certain embodiments, a component may be configured to be integrated within a dashboard. The component may receive data from one or more user database and provide one or more representations of the data. The component may be integrated within the dashboard as a separate component. That is, the component may provide the plurality of representations independent of the dashboard. The component may be maintained independent of the dashboard and, thus, may be updated independent of the dashboard.

20 Claims, 11 Drawing Sheets

(56) References Cited

U.S. PATENT DOCUMENTS

| | | |
|---|---|---|
| 10,353,912 B2 | 7/2019 | Zheng et al. |
| 10,360,136 B2 | 7/2019 | Zheng et al. |
| 10,380,136 B2 | 8/2019 | Zheng et al. |
| 10,489,405 B2 | 11/2019 | Zheng et al. |
| 2005/0267725 A1* | 12/2005 | Reeder .................... G06F 9/451 703/22 |
| 2018/0341388 A1* | 11/2018 | Zheng ................. G06F 3/04842 |
| 2018/0341392 A1 | 11/2018 | Zheng et al. |
| 2019/0073612 A1 | 3/2019 | Tobin et al. |

\* cited by examiner

COMPONENTIZED DASHBOARDS

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to database systems and more specifically to database systems and techniques for visualizing data within a database.

BACKGROUND

Data from databases are may be visualized through various applications or programs. Typically, interactions, such as expandable or collapsible sections, carousels, and/or other such features are preferred by users. However, such interactions are difficult to maintain as each interactive element requires a separate page for each animation "frame." Thus, including multiple animated or interactive elements within a visualization results in an exponential increase in the number of pages that need to be maintained. Changing each page may also affect the flow and feel of other pages.

BRIEF DESCRIPTION OF THE DRAWINGS

The included drawings are for illustrative purposes and serve only to provide examples of possible structures and operations for the disclosed inventive systems, apparatus, methods and computer program products for componentized dashboards for data visualization. These drawings in no way limit any changes in form and detail that may be made by one skilled in the art without departing from the spirit and scope of the disclosed implementations.

DETAILED DESCRIPTION

Some implementations of the disclosed systems, apparatus, methods and computer program products are configured for componentized dashboards for data visualization. A system may provide for a visualization framework, such as a dashboard, with one or more components. Each of the one or more components may be configured to receive data and provide a plurality of scrollable representations of the data within a portion of the visualization framework. Each of the one or more components may be integrated within the visualization framework as a singular object, regardless of the number of scrollable views.

Specifically, the disclosed systems and techniques allow for a data visualization dashboard that includes components with a plurality of data representations. The components may allow for scrolling through the plurality of views independent of the dashboard and may include, for example, expandable or collapsible sections, carousels, and/or other such features. As such, the components may be separately maintained and configured from that of the dashboard.

In a first example, Igor is in charge of SavageJaguar's data visualization back end. SavageJaguar utilizes Newton's Recipe's data analysis and visualization suite. However, if multiple versions of visualization are needed, Newton's Recipe requires that individual dashboard pages are needed for each different visualization, no matter what element on the dashboard is actually changed. However, due to Newton's Recipe's current configuration, visualization changes between various elements would exponentially increase the amount of pages that are required to be maintained, Newton's Recipe limits each dashboard to a total of twenty pages. The twenty page limit prevents Igor from providing the rich experience that he desires and, thus, Igor becomes extremely frustrated with Newton's Recipe.

Figure 1:
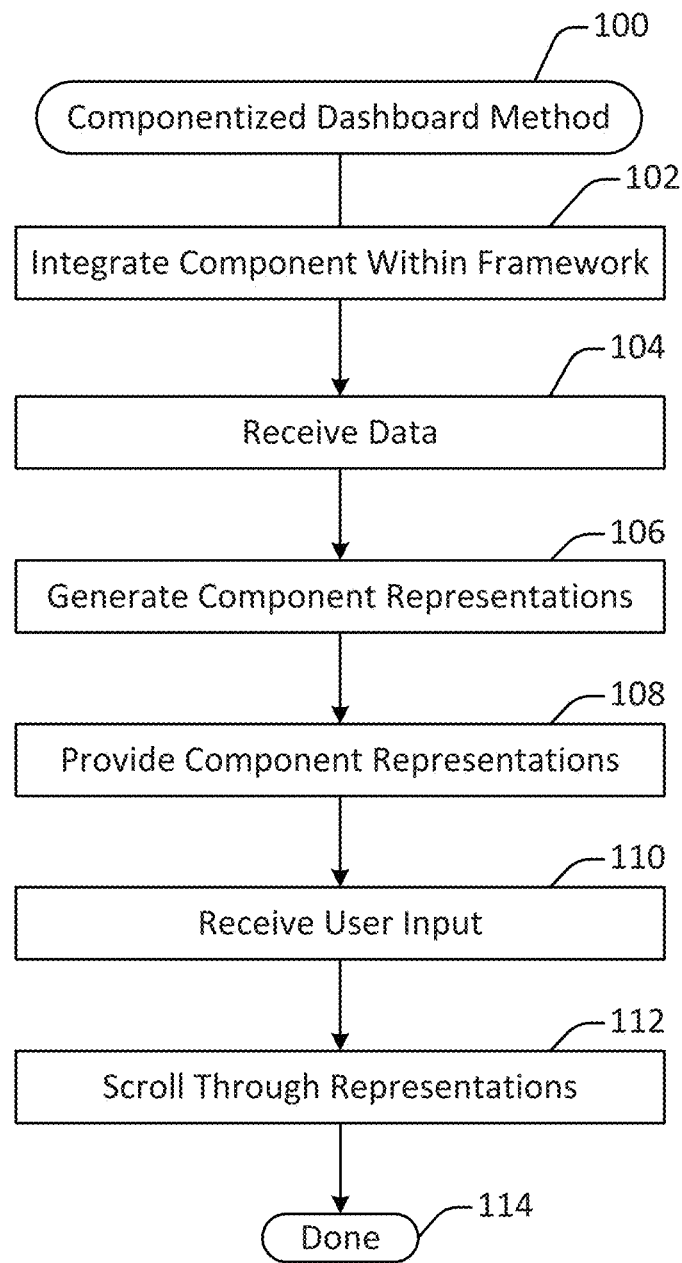
FIG. 1 illustrates an example overview method for a componentized dashboard method, performed in accordance with one or more embodiments.

FIG. 1 illustrates an example overview method for a componentized dashboard method, performed in accordance with one or more embodiments. FIG. 1 illustrates componentized dashboard method 100. Method 100 allows for a dashboard to utilize components that allow for a plurality of views for a data representation. Such a dashboard may be referred to herein as a framework. The framework may be an overall representation that includes one or more visualizations of data.

One or more components may be integrated within a visualization framework in 102. The visualization framework may be a dashboard that allows for data visualization. Each component may be configured to receive data from a user dataset, stored locally and/or stored on the cloud, and provide a plurality of representations of the data. Each component may be configured to be placed within a portion of the visualization framework. Each component may be incorporated into the visualization framework as a singular object. That is, each component may allow a user to scroll through a plurality of representations of data without the visualization framework switching between different views, expand or collapse such views, and/or carrousel through the various views. Thus, a user may view a plurality of different representations of the data within the component while remaining on the same visualization framework view. As such, each component may be maintained separately from the framework. Each component may, thus, be updated (e.g., the views may be changed, views may be added, views may be deleted, and/or other aspects of the components may be updated) without requiring changes to the visualization framework itself.

In 104, data is received for the representation of the component. In various embodiments, the data may be received from, for example, a user database or dataset, data stored locally (e.g., on an electronic device of the user), and/or data stored on the cloud. In various embodiments, the data may be maintained for the user by a third party service (e.g., a data management service) or by the user (e.g., on the cloud or locally). In certain embodiments, the user may provide instructions as to a specific dataset for visualization and/or the location thereof to receive the data from. Accordingly, the component may access and/or receive the dataset accordingly.

In various embodiments, the dataset may be updated. In certain embodiments, the user may indicate that the dataset has been updated and the component may access the updated dataset and update the plurality of representations accordingly. In other embodiments, the component and/or the framework may determine when dataset has been updated (e.g., through data provided by the database and/or through periodic checking of the database). The plurality of representations may then be updated accordingly.

In 106, the component may generate a plurality of representations of the dataset. Thus, for example, the component may utilize the data accessed and/or received in 104 and, with the data, generate a plurality of representations such as pie charts, bar charts, animations, and/or other visual representations that may, for example, collapse, expand, and/or carousel through the various representations. Each of the plurality of representations may be configured to be displayed within the component based on user input. As such, the component may be configured so that the user may, for example, scroll through the plurality of representations of the data.

In various embodiments, the component may generate the plurality of representations locally (e.g., on an electronic device of the user) or remotely (e.g., at a server device, which may then provide the representations to the electronic device of the user through communications data). For components generated locally, aspects of the framework may be stored locally. Alternatively, the framework may also be generated remotely and/or stored remotely (e.g., stored on the cloud) and communicated to the electronic device.

In a typical framework, a separate framework page needs to be maintained for every possible variation between representations of data. Thus, a certain typical framework may include 3 representations of a first dataset, 4 representations of a second dataset, and 4 representations of a third dataset. For a typical framework, 48 different framework pages would need to be maintained to provide for the different variations of the representations. If a user attempted to add an additional representation for the third dataset, a further 12 framework pages (3 of the first dataset multiplied by 4 of the second dataset) would need to be added.

Furthermore, such a typical configuration would, for the example framework with 3, 4, and 4 representations of the first, second, and third datasets, respectively, if a representation of a certain dataset is updated, require the updating of all representations of other datasets. Thus, for example, if one representation of the third dataset is updated, 12 framework pages would need to be updated, to update all different combinations of framework pages that include the one representation of the third dataset. If two representations of the third dataset are updated, 24 framework parts would need to be updated. As such, updating representations of datasets in typical frameworks involve a lot of work and/or processing and increase exponentially.

In certain embodiments described herein, the components may generate and/or store the plurality of representations independent of the framework. As such, each component may provide a plurality of representations independently of other components or portions of the framework. Such a configuration requires storage for only one version of the framework, with the components incorporated into the framework and controlled independently of the framework. Representations of datasets are then provided through the component, independently of the framework.

Thus, the techniques described herein allow for components that provide representations of one or more datasets within a framework. Components eliminate the requirement that the framework store each permutation of the different representations of datasets. Accordingly, the techniques described herein allow for frameworks to provide a rich dynamic experience while avoiding the need to store exponentially larger amounts of framework pages when additional representations of datasets are required. As such, the components described herein allow for representations of data to be provided in a much more memory efficient manner. Due to the memory efficiency and because each additional representation is simply an additional representation in a component, instead of adding to an exponential increase in the number of framework pages, components may be presented in a manner that would not tax or overwhelm the memory of systems.

Additionally, the techniques described herein allow for updating of representations based on the component. Thus, to update a representation of a dataset, the component corresponding to the dataset (e.g., the component that provides the visualization of the dataset) is updated, without the need to update any other component or dataset representation. Updating of representations of a dataset may thus be performed in a simplified and memory efficient manner.

In 108, the various representations of the component may be provided to, for example, an electronic device of the user. The component may provide a plurality of representations, as described herein, and the component may be configured to allow for the user and/or another party to scroll through the plurality of representations. As such, the component may allow for a user to view a plurality of representations of the data while remaining on the same framework page. Thus, only a single framework page may need to be maintained while providing a plurality of component views. Furthermore, the components may allow for a rich dynamic experience for the user when viewing representations of the data.

In 110, a user input is received through, for example, the electronic device of the user. The user input may be, for example, an input on a user interface (e.g., a touchscreen, via mouse or key, and/or another such input device) of an electronic device. The user input may include instructions to scroll through one or more representations of the data on the component.

In 112, based on the user input, the component may scrod through the plurality of representations. As such, based on the user input, one or more of the representations of the data may be provided to the electronic device of the user (e.g., through a graphical user interface of the electronic device).

Referring back to the example of Igor and SavageJaguar, one month later, Newton's Recipe has updated their data visualization suite to incorporate components as described herein. As such, Igor creates a new dashboard that includes such components. Igor configures the dashboard so that the components are configured to access his data stored on the cloud and, furthermore, so that the components are rendered locally on his electronic device. Igor then updates the data on his database. The components of his dashboard then accordingly access the data stored on the cloud and accordingly update their representations of the data.

Figure 2:
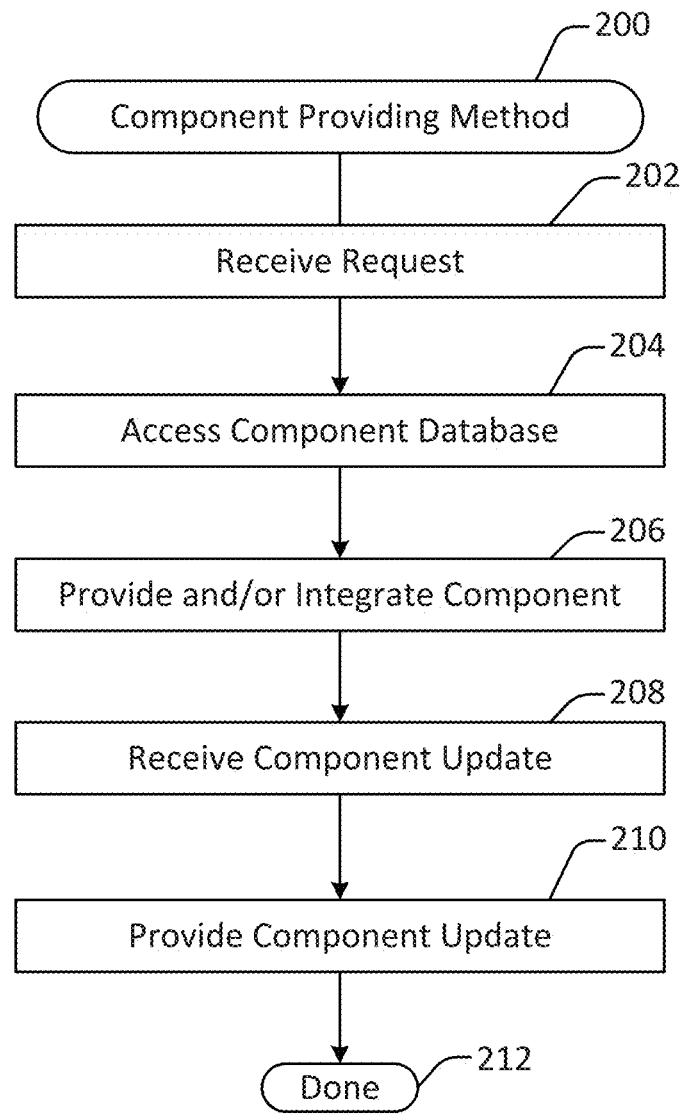
FIG. 2 illustrates an example component providing method, performed in accordance with one or more embodiments.

FIG. 2 illustrates an example component providing method, performed in accordance with one or more embodiments. Method 200 of FIG. 2 illustrates a technique for providing components as well as updating components. Such components are integrated within a framework, as described herein. As such, in certain embodiments, method 200 allows for a component to be provided and/or integrated within a framework as well as updated when integrated within the framework.

In 202, a request for the component is received. The request may be provided by the user via, for example, the electronic device of the user. In certain embodiments, the request may identify the component and/or the location of the data that the component should access.

In 204, based on the request, a component database is accessed to retrieve and/or provide the component. In various embodiments, one or more components may be contained within a component database. The component database may be a database configured in the manner described herein. The component database may include data associated with the various components and may, for example, provide the data upon request. As such, the component database may be configured to receive the request and provide the data associated with the component based on the request to allow the component to be integrated within the framework.

In certain embodiments, the component database may configure the component for integration within the framework. As such, the component database may access the dataset identified by the user and configure the component according to the data. The component database may, thus, generate the plurality of representations of the data according to the techniques of components. Thus, for example, the component database may generate representations such as bar charts, pie charts, animations, and/or other representations of the components. Such representations may be configured so that a user may scroll through the plurality of representations. Thus, for example, the component may be configured to present one or more representations at one time, and allow for the user to scroll through other representations.

In 206, the component is provided and/or integrated within the framework. In embodiments where the component is provided to an electronic device of the user for integration within a framework, the data associated with the component may be communicated to the electronic device of the user. In various embodiments, the component may be configured so that, while integrating the component within the framework, the user may indicate the location of data for the component to receive data from.

In embodiments where the component database integrates the component within a framework, the component database may provide a framework that includes the component integrated within. In such embodiments, the component may be configured to access the database, as instructed by the user, and to provide the plurality of views within the framework. The framework is then communicated to the electronic device of the user.

In 208, the component may be updated. For example, the component may be updated by a developer creating a new version of the component. The developer may then upload the new version. Thus, in certain embodiments, the component may be created by a developer and the developer may provide the component for users to download and integrate into their framework.

In 210, the component update is provided. In various embodiments, an online store or another portal may provide the component. The developer may then release updates through the online store and/or portal. The component may then automatically update based on the changes and/or the update may be provided to the user (e.g., by communicating the update to the electronic device of the user). Alternatively, the user may be notified when the component has been updated and the user may then manually confirm to receive the update (e.g., through the electronic device of the user). As such, the component may be updated.

In certain other embodiments, such as when the component database integrates the component within a framework, the component database may determine that the component has been updated (e.g., through the developer uploading a new version of the component and/or determining that the version number of the component has been changed). Thus, for example, in certain embodiments, the component database may detect when another version of the component has been uploaded to the component database. The component database may then update the component integrated within the framework with the new component.

Referring back to Igor and SavageJaguar, Igor has integrated a component within his dashboard. The component allows for data to be presented in three different bar chart forms, two different pie chart forms, a line graph, an animated line graph, two different time dependent line graphs, and in a x-y plot. The component may also allow for up and down scrolling, carousel-ing, and/or expansion or collapse of the visualizations within the component. The component is integrated within SavageJaguar's general dashboard, which allows for Igor to pick from one of four different datasets that SavageJaguar has created, directed to internal combustion engine technologies as compared to electric motor technologies, to create visualizations of.

A week later, the component is updated by the developer. SavageJaguar's dashboard determines that the component has been updating by checking with the component database of Newton's Recipe. The dashboard then downloads the update and automatically updates the representations of data. Furthermore, after the update, the component also checks the database of SavageJaguar to confirm that the latest representations are generated by the latest datasets of SavageJaguar. The component is thus able to update and provide updated versions of the plurality of views according to the update.

Figure 3A:
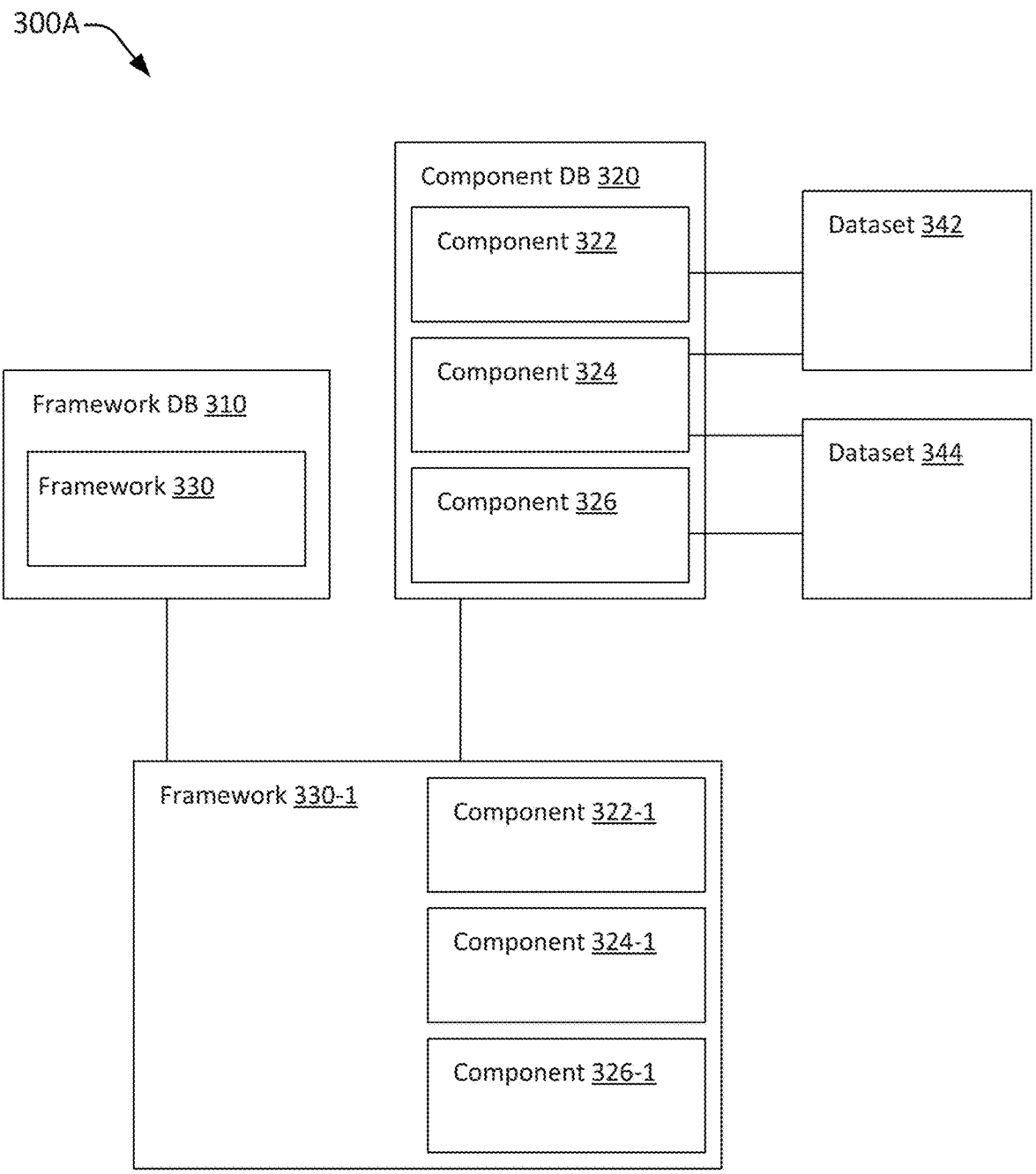
FIG. 3A illustrates an example configuration of a componentized dashboard system, configured in accordance with one or more embodiments.

FIG. 3A illustrates an example configuration of a componentized dashboard system, configured in accordance with one or more embodiments. FIG. 3A illustrates system 300A that is configured to provide one or more components for integration within a framework (e.g., a framework associated with a user) and for the component to access one or more databases or datasets to provide a plurality of representations for data of one or more databases or datasets. System 300A includes framework database 310, component database 320, framework 330-1, and one or more datasets, such as datasets 342 and 344. The various databases of system 300A may be configured in the manner as described herein.

Framework database 310 may a database configured to store and/or maintain one or more frameworks, such as framework 330. Each framework may be, for example, a dashboard for data visualization for use by a user. The framework may be, for example, an overall structure for a page that provides data visualization. Thus, the framework provides the basis for the page that a visitor sees when visiting the data visualization framework.

In certain embodiments, a user may request a framework from framework database 310. Thus, for example, the user may request framework 330 from framework database 310. Framework 330 may, in certain embodiments, be a skeleton framework that the user than populates with the user's information. In various embodiments, framework 330 may include specific areas that a user may populate with certain information, such as data visualizations.

Typically, users wishing to incorporate a plurality of visualizations (and, thus, in certain embodiments, allow for animations or other frame based visualizations) need to maintain a plurality of framework pages. In certain embodiments, each "frame" of an animation is required to be maintained as a separate framework page. When a plurality of datasets are required to be visualized in different manners or through animation, such a configuration requires storage of an exponential number of separate framework pages, increasing the storage memory requirements. Also, as each page of the framework may need to be separately maintained, the maintenance requirements of the frameworks may be prohibitive.

In the techniques described herein, components may be integrated within frameworks. Components may be configured to be portions of frameworks. Components may be configured to allow for a plurality of representations of a dataset. In certain embodiments, the plurality of representations may be, for example, an animation or other rich dynamic experience. In other embodiments, the plurality of representations may be, for example, a plurality of views that allow for a user to scroll through the plurality of representations. The components described herein allow for a visualization experience that includes a plurality view frames or animations without requiring a plurality of separate framework pages. Such a configuration allows for more efficient use of resources as the memory requirements will decrease and result in improved operation of electronic devices (e.g., at a server device, which may then provide the representations to the electronic device of the user through communications data).

Components (e.g., components 322, 324, and 326) may be stored in component database 320. In certain embodiments, component database 320 is a separate database from framework database 310, but other embodiments (such as the embodiment of FIG. 38) may store the components and framework within the same database.

In certain situations, a user may configure a framework (e.g., framework 330-1, which is framework 330 requested framework database 310) and integrate one or more components (e.g., components 322-1, 324-1, and 326-1) within the framework. As such, the user may provide a request for one or more components (e.g., components 322, 324, and 326) to component database 320. In various embodiments, such components may be configured to be integrated into one or more frameworks (e.g., framework 330-1). The user may, thus, pick and choose the specific components to be integrated within framework 330-1. The components may be configured to receive one or more datasets (e.g., datasets 342 and/or 344) and generate a plurality of visualizations of the dataset(s), independent of the framework. Thus, integrating the components within the framework may allow a user to offer the plurality of views of visualizations of the dataset without configuring a plurality of framework pages.

As such, Igor may utilize framework 330 from framework database 310. Thus, Igor configures framework 330-1, which is his version of a framework based off of framework 300A, provided by framework database 310. Igor then selects components 322, 324, and 326 for integration with his frame work 330-1. Igor thus requests components 322, 324, and 326 from component database 320, which are accordingly provided by component database 320 through one or more data connections. Components 322-1, 324-1, and 326-1 (Igor's versions of components 322, 324, and 326, respectively) are then integrated within framework 330-1.

Components 322-1, 324-1, and 326-1 may each be configured to access one or more databases and/or datasets and provide visualizations of data within the databases and/or datasets. In certain configurations, the components may be pre-associated (e.g., by a developer) with the various datasets. In other configurations, the components may be configured (e.g., by a user) to be associated with datasets by a user.

In the embodiment of FIG. 3A, component 322-1 may be configured to access dataset 342 and provide a plurality of visualizations of the dataset of dataset 342. Component 3244 may be configured to access datasets 342 and 344 and provide a plurality of visualizations of the combined datasets of datasets 342 and 344. Component 326-1 may be configured to access dataset 344 and provide a plurality of visualizations of the combined datasets of dataset 344. Thus, components 322-1, 324-1, and 326-1 may each provide visualizations of different datasets. While the embodiments described herein include components that provide a plurality of representations/visualizations of datasets, it is appreciated that other components may provide only one representation/visualization.

In various embodiments, datasets 342 and/or 344 may be any type of dataset described herein, such as datasets stored within local memory, on the cloud, within a multi-tenant database, controlled by the user, controlled by a third party, and/or stored within databases of another type. In various embodiments, datasets may be pre-configured to interact with components to allow the components to provide visualizations of specific datasets. In other embodiments, Igor may, for example, specify the databases and/or datasets to be accessed and/or associated with the various components. The components may accordingly obtain (e.g., download) data of the datasets from the specified databases.

In various embodiments, the components may be configured to determine a characteristic of the data and determine one or more visualizations based on the determined characteristic. Thus, for example, the component may determine that the dataset has a label and a single value. Based on that single value, the component may determine that a bar chart and a pie chart are to be visualized in a manner that allows for the user to scroll between the visualizations. In another embodiment, the dataset may include two value columns and, based on the dataset, an X-Y graph and an animation of the X-Y relationship may be provided.

In another embodiment, a component may be specifically configured to certain data shapes. Thus, for example, the component may be configured to datasets of a certain shape or configuration e.g., a specific number of columns or organization for the data) and/or configured to determine the data shape or configuration of the dataset. Based on the data shape, the component may accordingly provide appropriate visualizations, animations, and/or other representations. In such a manner, the component may be configured to provide appropriate visualizations regardless of whether the dataset is updated or not as, though a dataset may be updated, the underlying data shape of the dataset will remain regardless of the update as the update will generally conform to the data shape.

In certain embodiments, framework 330-1 may be configured to operate in a first runtime. Components may be configured to operate in runtimes nested within the first runtime. As such, the runtimes of components may all operate within the first runtime. Such a configuration allows for various components (e.g., components 322-1, 324-1, and 326-1) to share data amongst each other. The sharing of data allows for the visualizations of different components within a dashboard to each be utilized while, for example, utilizing only a limited number (e.g., one) dataset. As the dataset is only associated with a limited number of components (e.g., less than the total number of components utilizing the dataset), memory (e.g., by avoiding duplicate datasets) and/or runtime resources (e.g., only one set of the dataset may be stored within runtime memory or Random Access Memory) may be utilized more efficiently. As such, for example, component 322-1 may be configured to receive data from dataset 342. The data from dataset 342 may then be shared with components 324-1 and 326-1 due to the nested runtime and, thus, components 324-1 and 326-1 may also provide visualizations of the data of dataset 342.

As described herein, the plurality of visualizations may be different chart types, animations, and/or other interactive elements such as videos, sounds, and/or other elements. The plurality of visualizations may allow for a user to scroll or view an animation while remaining on the same framework 330-1. Thus, utilizing the system described herein, the components may offer a plurality of visualizations and/or other interactive elements without requiring the maintenance of separate framework pages. Each of components 322-1, 324-1, and 326-1 may be separately maintained and/or updated. Furthermore, updating of one of components 322-1, 324-1, and 326-1, or the visualizations thereof, may not affect that of the other of components 322-1, 324-1, and 326-1.

Figure 3B:
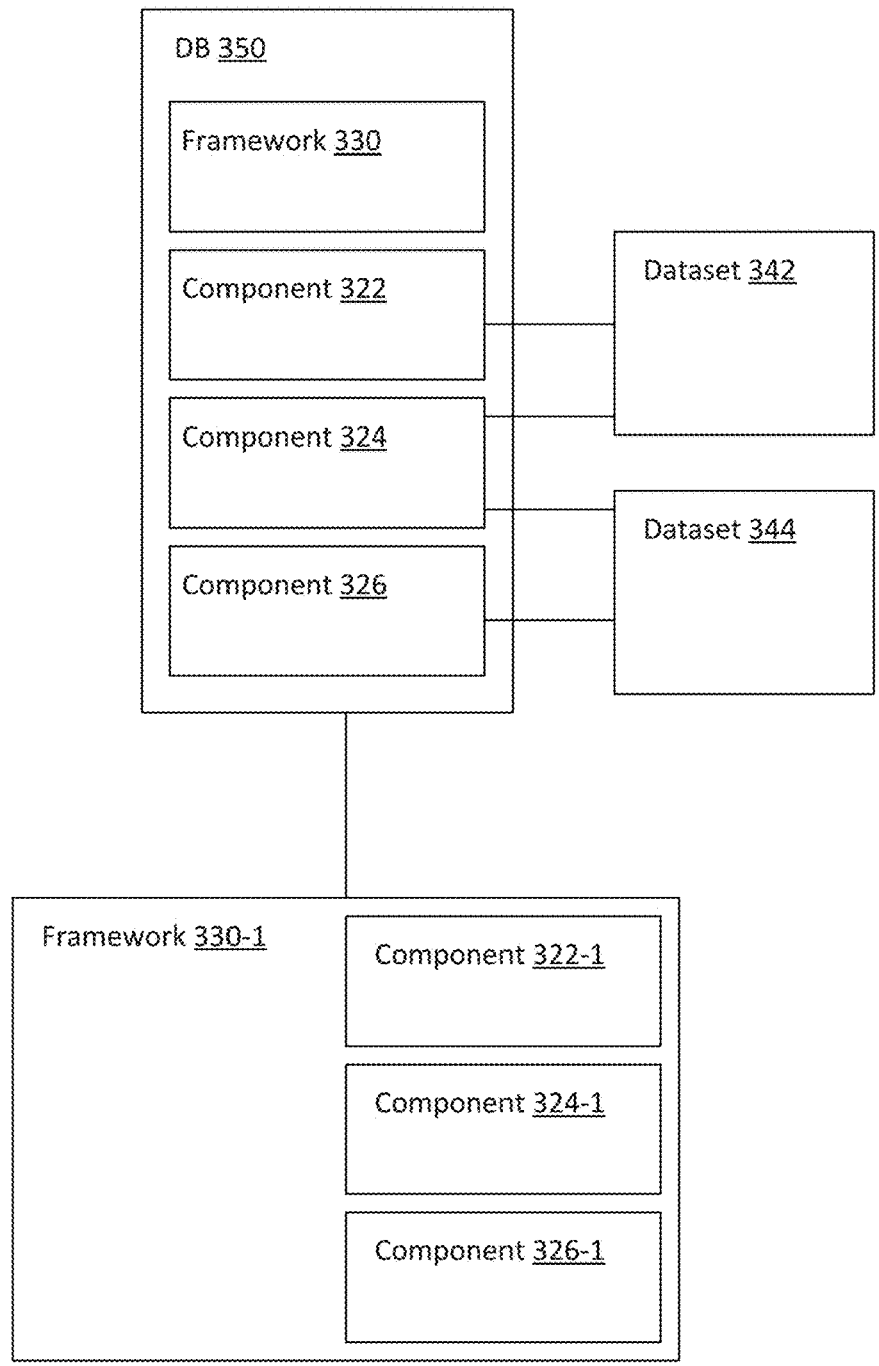
FIG. 3B illustrates another example configuration of a componentized dashboard system, configured in accordance with one or more embodiments.

FIG. 3B illustrates another example configuration of a componentized dashboard system, configured in accordance with one or more embodiments. FIG. 3B illustrates system 300B. In system 300B, both frameworks (e.g., framework 330) and components (e.g., components 322, 324, and 326) may be stored within database 350. As such, a user may request one or both of frameworks and components from database 350. Accordingly, in various embodiments, frameworks and components may be stored separately (as described in FIG. 3A) or stored within the same database (as in FIG. 3B).

Figure 3C:
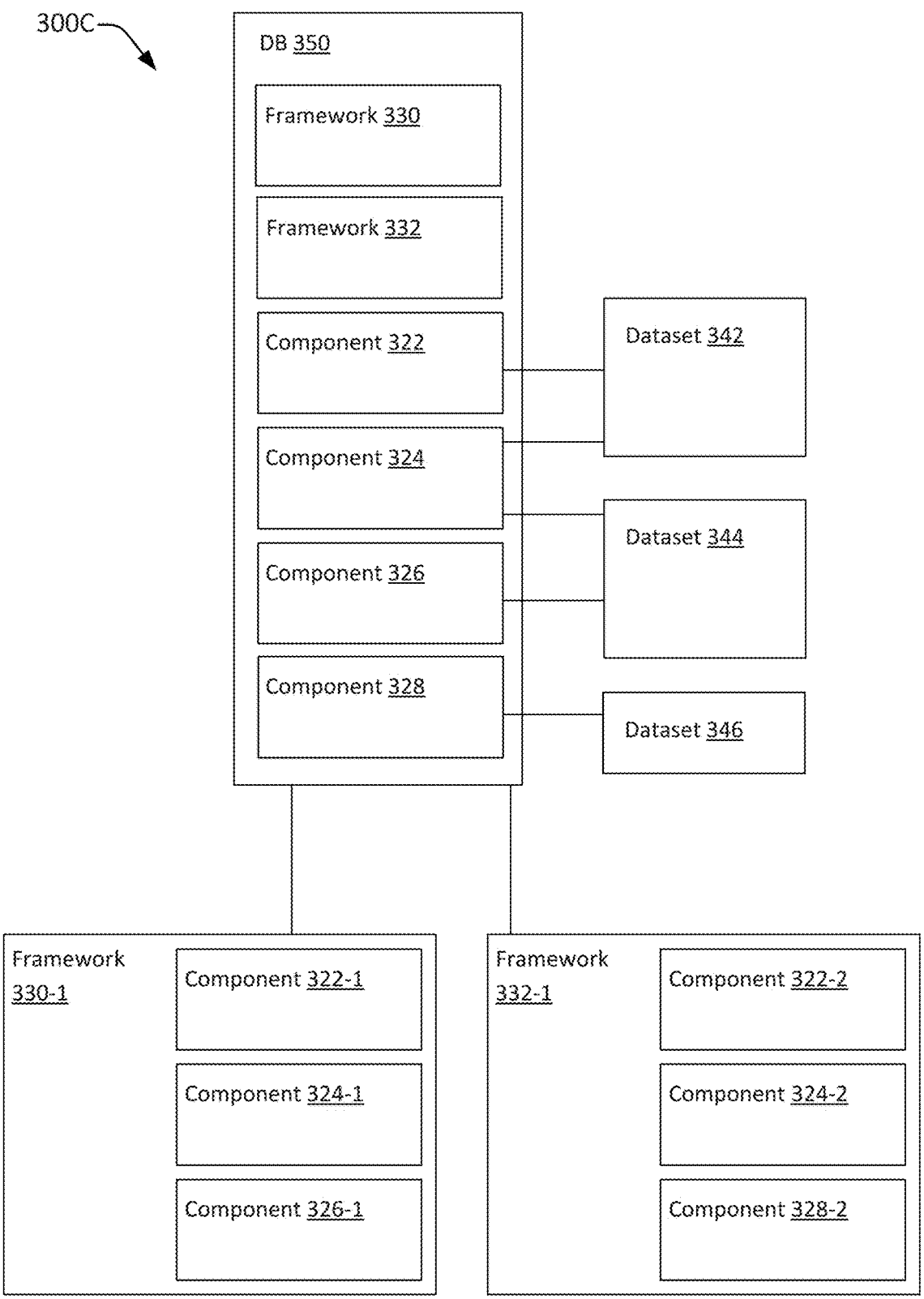
FIG. 3C illustrates a further configuration of a componentized dashboard system, configured in accordance with one or more embodiments.

FIG. 3C illustrates a further configuration of a componentized dashboard system, configured in accordance with one or more embodiments. FIG. 3C illustrates system 300C. As shown in system 300C, separate frameworks 330-1 and 332-1 may be configured (e.g., based on frameworks 330 and 332 of database 350). Frameworks 330-1 and 332-1 may be associated with the same user or with different users.

In FIG. 3C, frameworks 330-1 and 332-1 may be based off of frameworks 330 and 332, respectively. That is, framework 330 may be a skeleton framework that is provided to the user, to customize and/or configure as needed and, thus, become frameworks 330-1 when used by the user. Framework 332 may be a skeleton framework for framework 332-1. In certain embodiments, frameworks 330 and 332 may be configured to utilize components, such as components 322-328. Components 322-328 may be configured to be simultaneously utilized by a plurality of different frameworks. In such a manner, a plurality of frameworks may utilize the same components concurrently.

Frameworks 330-1 and 332-1 may be configured differently from each other, Thus, for example, a certain user may require a certain configuration of data visualization components while another user may require a different configuration. As such, though frameworks 330-1 and 332-1 may share some components and may also include different components, in various embodiments. Thus, framework 330-1 includes components 322-1, 324-1, and 326-1 while framework 332-1 includes components 322-2, 324-2, and 328-2. In certain embodiments, updating of a component, such as component 322, may result in updates for both components 322-1 and 322-2.

Figure 4:
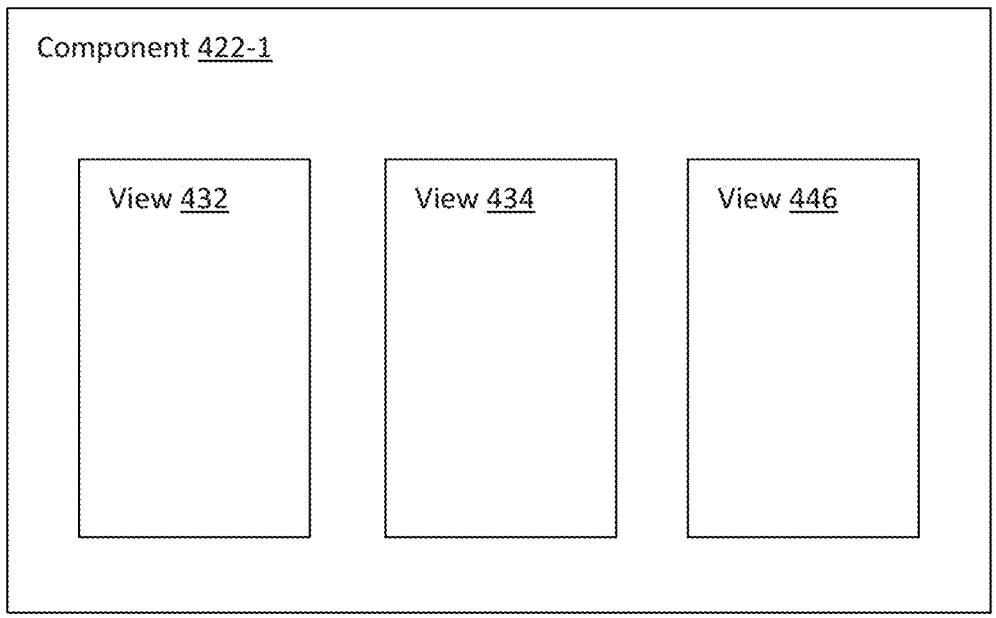
FIG. 4 illustrates an example component, configured in accordance with one or more embodiments.

FIG. 4 illustrates an example component, configured in accordance with one or more embodiments. FIG. 4 illustrates component 422-1. Component 422-1 may include a plurality of views, such as views 432, 434, and 436. Views 432, 434, and 436 may be visualizations of one or more datasets associated with component 422-1, such as the types of visualizations described herein. In various embodiments, component 422-1 may display views 432, 434, and 436 concurrently or may display views 432, 434, and 436 sequentially (e.g., a user may scroll through views 432, 434, and/or 436 based on inputs provided by the user).

Figure 5A:
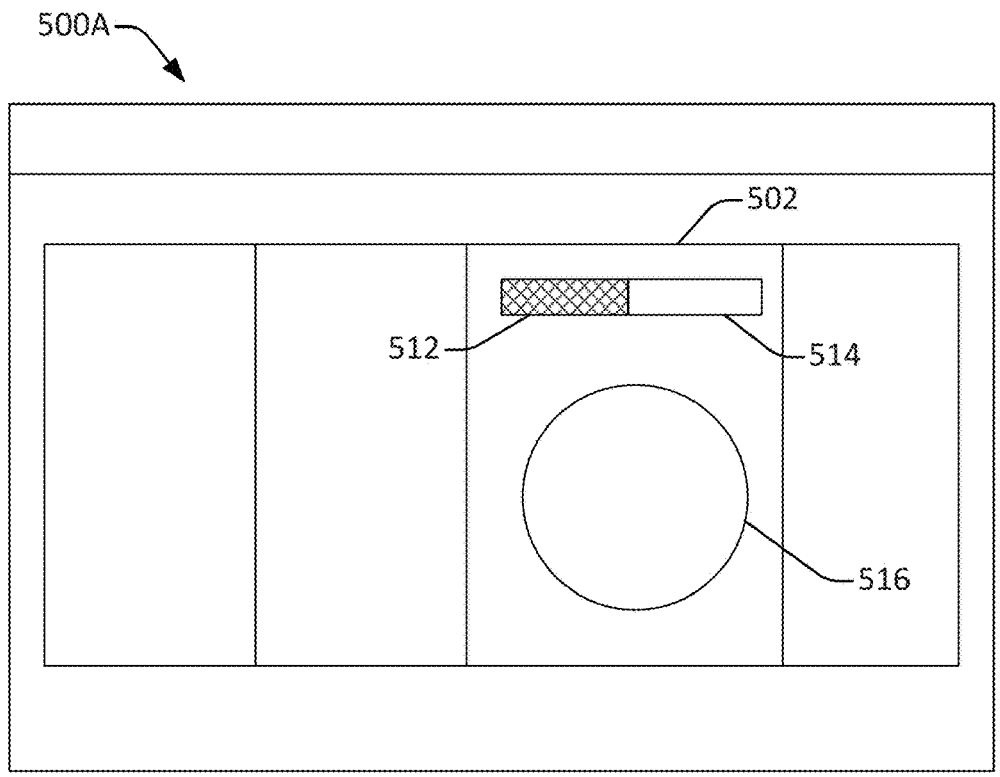
FIGS. 5A and 5B illustrate example componentized dashboards, configured in accordance with one or more embodiments.
Figure 5B:
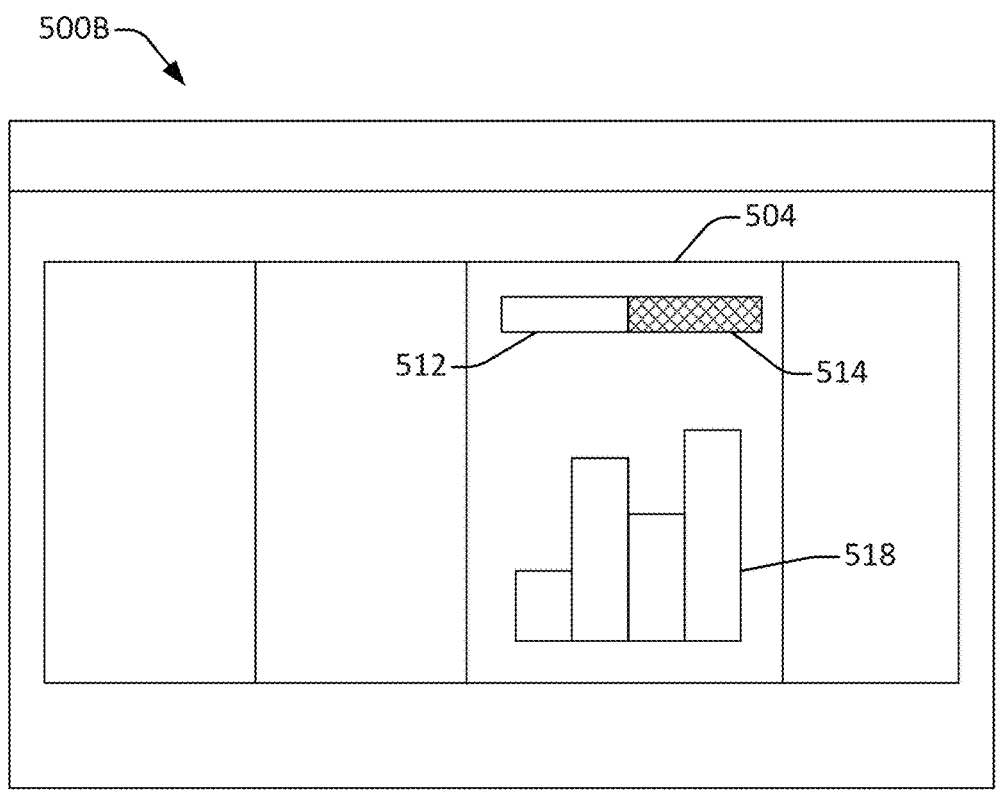

FIGS. 5A and 5B illustrate example componentized dashboards, configured in accordance with one or more embodiments. FIG. 5A illustrates dashboard 500A that includes component view 502. FIG. 5B illustrates dashboard 500B that includes component view 504. Component views 502 and 504 include chart selectors 512 and 514 that allow for a dataset to be visualized in two different views. Chart selectors 512 and 514 may allow for a user to select one of a plurality of component views (e.g., component views 502 and 504) and may be, for example, graphical user interface elements that allow for a user selection. In FIG. 5A, chart selector 512 is toggled to allow for component view 502 to be provided while, in FIG. 5B, chart selector 514 is toggled to allow for component view 504 to be provided. Component view 502 may include pie chart 516 while component view 504 may include bar chart 518. Thus, component views 502 and 504 provide for a plurality of visualizations of a dataset.

Figure 6:
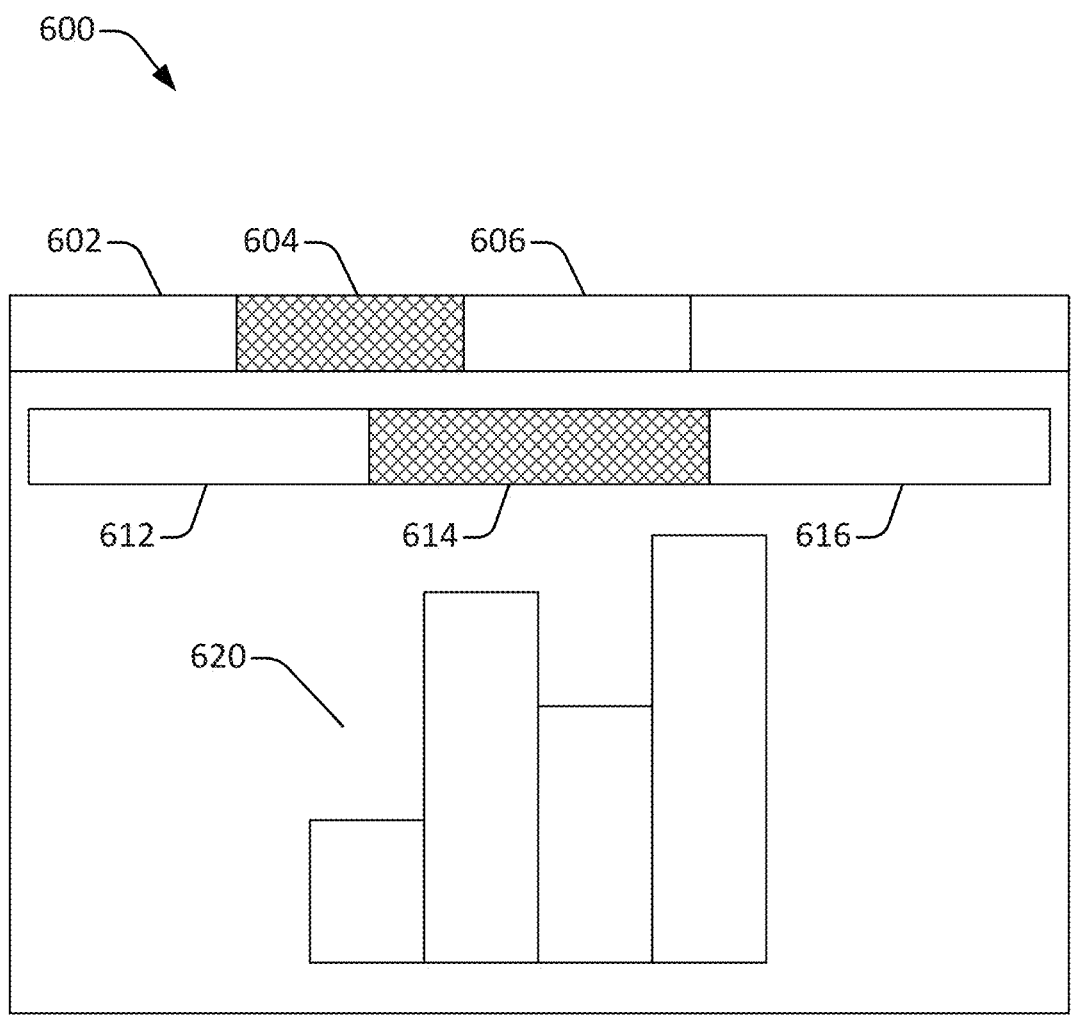
FIG. 6 illustrates an example component configuration, performed in accordance with one or more embodiments.

FIG. 6 illustrates an example component configuration, performed in accordance with one or more embodiments. Component 600 of FIG. 6 includes data selectors 602, 604, and 606, visualization selectors 612, 614, and 616, and visualization 620. Data selectors 602, 604, and 606 allow for a user to select a plurality of different dataset for visualizations. Thus, for example, component 600 may receive datasets from a plurality of different user databases and provide visualizations for each of the datasets. As such, component 600 may be a component configured to interface or be associated with a plurality of different databases.

Component 600 is configured to provide a plurality (e.g., three) of visualizations and/or animations for each dataset. Visualization selectors 612, 614, and 616 allow for a user to select which of the plurality of visualizations should be displayed within component 600. In the embodiment shown, visualization selector 614 is selected and visualization 620 is shown based on the selection. Selection of other visualization selectors 612, 614, or 616 may result in the presentation of other visualizations.

Additional information as to dashboards is presented in U.S. patent application Ser. No. 15/603,303, filed May 23, 2017, and entitled "Modular Runtime Environment," the contents of which are hereby incorporated by reference in their entirety.

Figure 7:
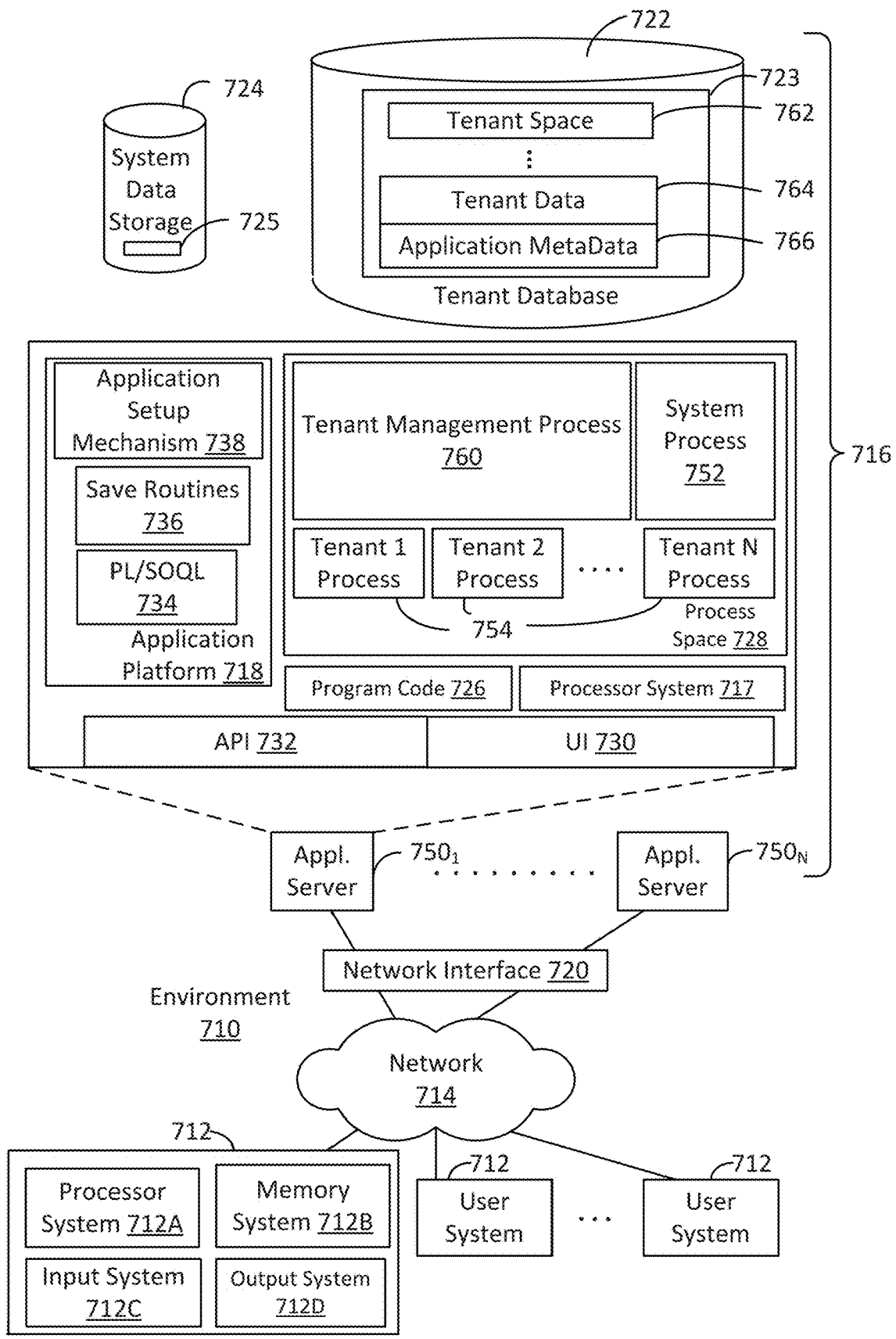
FIG. 7 shows a block diagram of an example of an environment that includes an on-demand database service, configured in accordance with some implementations.

FIG. 7 shows a block diagram of an example of an environment 710 that includes an on-demand database service configured in accordance with some implementations. Environment 710 may include user systems 712, network 714, database system 716, processor system 717, application platform 718, network interface 720, tenant data storage 722, tenant data 723, system data storage 724, system data 725, program code 726, process space 728, User Interface (UI) 730, Application Program Interface (API) 732, PL/SOQL 734, save routines 736, application setup mechanism 738, application servers 750-1 through 750-N, system process space 752, tenant process spaces 754, tenant management process space 760, tenant storage space 762, user storage 764, and application metadata 766. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 716, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 718 may be a framework that allows the creation, management, and execution of applications in system 716. Such applications may be developed by the database service provider or by users or third-party application developers accessing the service. Application platform 718 includes an application setup mechanism 738 that supports application developers' creation and management of applications, which may be saved as metadata into tenant data storage 722 by save routines 736 for execution by subscribers as one or more tenant process spaces 754 managed by tenant management process 760 for example. Invocations to such applications may be coded using PL/SOQL 734 that provides a programming language style interface extension to API 732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 766 for a subscriber making such an invocation. Such system processes may also manage execution of application metadata 766 as an application in a virtual machine.

In some implementations, each application server 750 may handle requests for any user associated with any organization. A load balancing function (e.g., an F5 Big-IP load balancer) may distribute requests to the application servers 750 based on an algorithm such as least-connections, round robin, observed response time, etc. Each application server 750 may be configured to communicate with tenant data storage 722 and the tenant data 723 therein, and system data storage 724 and the system data 725 therein to serve requests of user systems 712. The tenant data 723 may be divided into individual tenant storage spaces 762, which can be either a physical arrangement and/or a logical arrangement of data. Within each tenant storage space 762, user storage 764 and application metadata 766 may be similarly allocated for each user. For example, a copy of a user's most recently used (MRU) items might be stored to user storage 764. Similarly, a copy of MRU items for an entire tenant organization may be stored to tenant storage space 762. A UI 730 provides a user interface and an API 732 provides an application programming interface to system 716 resident processes to users and/or developers at user systems 712.

System 716 may implement a web-based componentized dashboard data visualization system. For example, in some implementations, system 716 may include application servers configured to implement and execute componentized dashboard data visualization software applications. The application servers may be configured to provide related data, code, forms, web pages and other information to and from user systems 712. Additionally, the application servers may be configured to store information to, and retrieve information from a database system. Such information may include related data, objects, and/or Webpage content. With a multi-tenant system, data for multiple tenants may be stored in the same physical database object in tenant data storage 722, however, tenant data may be arranged in the storage medium(s) of tenant data storage 722 so that data of one tenant is kept logically separate from that of other tenants. In such a scheme, one tenant may not access another tenant's data, unless such data is expressly shared.

Several elements in the system shown in FIG. 7 include conventional, well-known elements that are explained only briefly here. For example, user system 712 may include processor system 712A, memory system 712B, input system 712C, and output system 712D. A user system 712 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 712 to access, process and view information, pages and applications available from system 716 over network 714. Network 714 may be any network or combination of networks of devices that communicate with one another, such as any one or any combination of a LAN (local area network), WAN (wide area network), wireless network, or other appropriate configuration.

The users of user systems 712 may differ in their respective capacities, and the capacity of a particular user system 712 to access information may be determined at least in part by "permissions" of the particular user system 712. As discussed herein, permissions generally govern access to computing resources such as data objects, components, and other entities of a computing system, such as a componentized dashboard data visualization, a social networking system, and/or a CRM database system. "Permission sets" generally refer to groups of permissions that may be assigned to users of such a computing environment. For instance, the assignments of users and permission sets may be stored in one or more databases of System 716. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 716 may provide on-demand database service to user systems 712 using an MTS arrangement. By way of example, one tenant organization may be a company that employs a sales force where each salesperson uses system 716 to manage their sales process. Thus, a user in such an organization may maintain contact data, leads data, customer follow-up data, performance data, goals and progress data, etc., all applicable to that user's personal sales process (e.g., in tenant data storage 722). In this arrangement, a user may manage his or her sales efforts and cycles from a variety of devices, since relevant data and applications to interact with (e.g., access, view, modify, report, transmit, calculate, etc.) such data may be maintained and accessed by any user system 712 having network access.

When implemented in an MIS arrangement, system 716 may separate and share data between users and at the organization-level in a variety of manners. For example, for certain types of data each user's data might be separate from other users' data regardless of the organization employing such users, Other data may be organization-wide data, which is shared or accessible by several users or potentially all users form a given tenant organization. Thus, some data structures managed by system 716 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 716 may also maintain system-level data usable by multiple tenants or other data. Such system-level data may include industry reports, news, postings, and the like that are sharable between tenant organizations.

In some implementations, user systems 712 may be client systems communicating with application servers 750 to request and update system-level and tenant-level data from system 716. By way of example, user systems 712 may send one or more queries requesting data of a database maintained in tenant data storage 722 and/or system data storage 724. An application server 750 of system 716 may automatically generate one or more SQL statements (e.g., one or more SQL queries) that are designed to access the requested data. System data storage 724 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

Figure 8A:
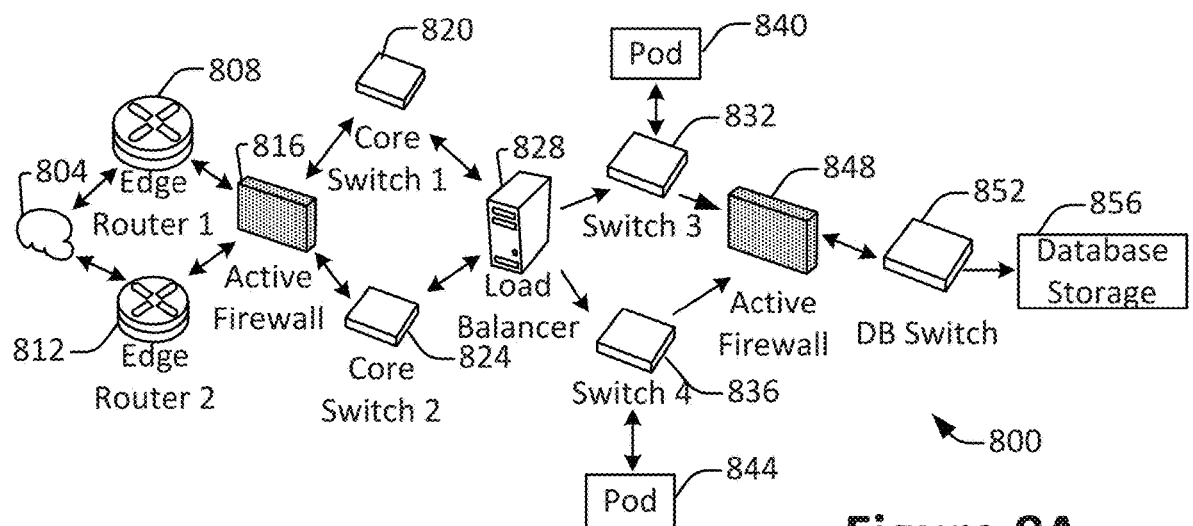
FIGS. 8A and 8B illustrate examples of a computing system, configured in accordance with one or more embodiments.

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers, FIG. 8A shows a system diagram of an example of architectural components of an on-demand database service environment 800, configured in accordance with some implementations. A client machine located in the cloud 804 may communicate with the on-demand database service environment via one or more edge routers 808 and 812. A client machine may include any of the examples of user systems 712 described above. The edge routers 808 and 812 may communicate with one or more core switches 820 and 824 via firewall 816. The core switches may communicate with a load balancer 828, which may distribute server load over different pods, such as the pods 840 and 844 by communication via pod switches 832 and 836. The pods 840 and 844, which may each include one or more servers and/or other computing resources, may perform data processing and other operations used to provide on-demand services. Components of the environment may communicate with a database storage 856 via a database firewall 848 and a database switch 852.

Accessing an on-demand database service environment may involve communications transmitted among a variety of different components. The environment 800 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 8A and 8B.

The cloud 804 refers to any suitable data network or combination of data networks, which may include the Internet. Client machines located in the cloud 804 may communicate with the on-demand database service environment 800 to access services provided by the on-demand database service environment 800. By way of example, client machines may access the on-demand database service environment 800 to retrieve, store, edit, and/or process componentized dashboard data visualization information.

In some implementations, the edge routers 808 and 812 route packets between the cloud 804 and other components of the on-demand database service environment 800. The edge routers 808 and 812 may employ the Border Gateway Protocol (BGP). The edge routers 808 and 812 may maintain a table of IP networks or 'prefixes', which designate network reachability among autonomous systems on the internet.

In one or more implementations, the firewall 816 may protect the inner components of the environment 800 from internet traffic. The firewall 816 may block, permit, or deny access to the inner components of the on-demand database service environment 800 based upon a set of rules and/or other criteria. The firewall 816 may act as one or more of a packet filter, an application gateway, a stateful filter, a proxy server, or any other type of firewall.

In some implementations, the core switches 820 and 824 may be high-capacity switches that transfer packets within the environment 800. The core switches 820 and 824 may be configured as network bridges that quickly route data between different components within the on-demand database service environment. The use of two or more core switches 820 and 824 may provide redundancy and/or reduced latency.

In some implementations, communication between the pods 840 and 844 may be conducted via the pod switches 832 and 836. The pod switches 832 and 836 may facilitate communication between the pods 840 and 844 and client machines, for example via core switches 820 and 824. Also or alternatively, the pod switches 832 and 836 may facilitate communication between the pods 840 and 844 and the database storage 856. The load balancer 828 may distribute workload between the pods, which may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848, which may act as a computer application firewall operating at the database application layer of a protocol stack. The database firewall 848 may protect the database storage 856 from application attacks such as structure query language (SQL) injection, database rootkits, and unauthorized information disclosure. The database firewall 848 may include a host using one or more forms of reverse proxy services to proxy traffic before passing it to a gateway router and/or may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, the database storage 856 may be an on-demand database system shared by many different organizations. The on-demand database service may employ a single-tenant approach, a multi-tenant approach, a virtualized approach, or any other type of database approach. Communication with the database storage 856 may be conducted via the database switch 852. The database storage 856 may include various software components for handling database queries. Accordingly, the database switch 852 may direct database queries transmitted by other components of the environment (e.g., the pods 840 and 844) to the correct components within the database storage 856.

Figure 8B:
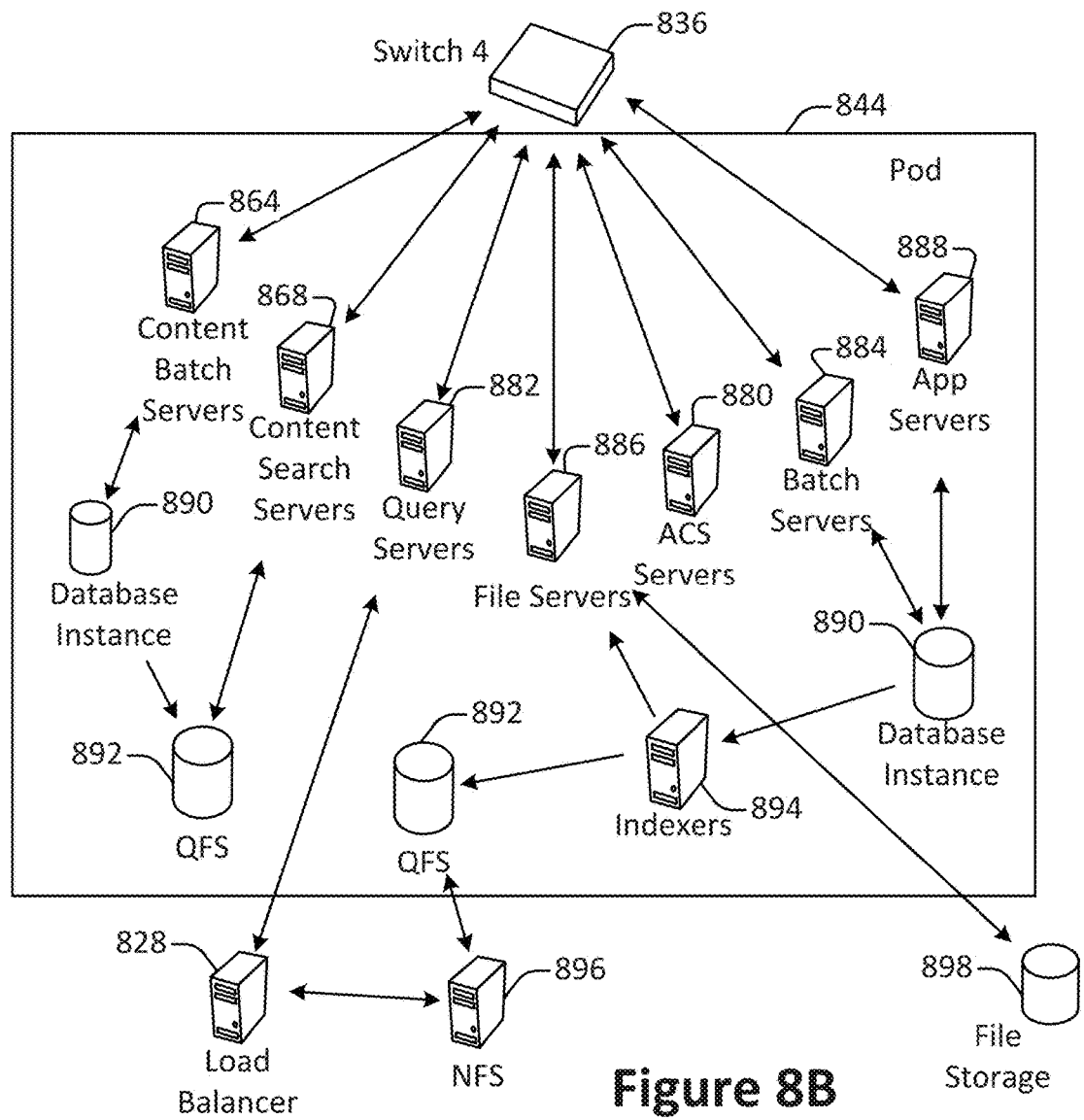

FIG. 8B shows a system diagram further illustrating an example of architectural components of an on-demand database service environment, in accordance with some implementations. The pod 844 may be used to render services to user(s) of the on-demand database service environment 800. The pod 844 may include one or more content batch servers 864, content search servers 868, query servers 882, file servers 886, access control system (ACS) servers 880, batch servers 884, and app servers 888. Also, the pod 844 may include database instances 890, quick file systems (QFS) 892, and indexers 894. Some or all communication between the servers in the pod 844 may be transmitted via the switch 836.

In some implementations, the app servers 888 may include a framework dedicated to the execution of procedures (e.g., programs, routines, scripts) for supporting the construction of applications provided by the on-demand database service environment 800 via the pod 844. One or more instances of the app server 888 may be configured to execute all or a portion of the operations of the services described herein.

In some implementations, as discussed above, the pod 844 may include one or more database instances 890. A database instance 890 may be configured as an MTS in which different organizations share access to the same database, using the techniques described above. Database information may be transmitted to the indexer 894, which may provide an index of information available in the database 890 to file servers 886. The QFS 892 or other suitable filesystem may serve as a rapid-access file system for storing and accessing information available within the pod 844. The QFS 892 may support volume management capabilities, allowing many disks to be grouped together into a file system. The QFS 892 may communicate with the database instances 890, content search servers 868 and/or indexers 894 to identify, retrieve, move, and/or update data stored in the network file systems (NFS) 896 and/or other storage systems.

In some implementations, one or more query servers 882 may communicate with the NFS 896 to retrieve and/or update information stored outside of the pod 844. The NFS 896 may allow servers located in the pod 844 to access information over a network in a manner similar to how local storage is accessed. Queries from the query servers 822 may be transmitted to the NFS 896 via the load balancer 828, which may distribute resource requests over various resources available in the on-demand database service environment 800, The NFS 896 may also communicate with the QFS 892 to update the information stored on the NFS 896 and/or to provide information to the QFS 892 for use by servers located within the pod 844.

In some implementations, the content batch servers 864 may handle requests internal to the pod 844. These requests may be long-running and/or not tied to a particular customer, such as requests related to log mining, cleanup work, and maintenance tasks. The content search servers 868 may provide query and indexer functions such as functions allowing users to search through content stored in the on-demand database service environment 800. The file servers 886 may manage requests for information stored in the file storage 898, which may store information such as documents, images, basic large objects (BLOBs)), etc. The query servers 882 may be used to retrieve information from one or more file systems. For example, the query system 882 may receive requests for information from the app servers 888 and then transmit information queries to the NFS 896 located outside the pod 844. The ACS servers 880 may control access to data, hardware resources, or software resources called upon to render services provided by the pod 844. The batch servers 884 may process batch jobs, which are used to run tasks at specified times. Thus, the batch servers 884 may transmit instructions to other servers, such as the app servers 888, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 9:
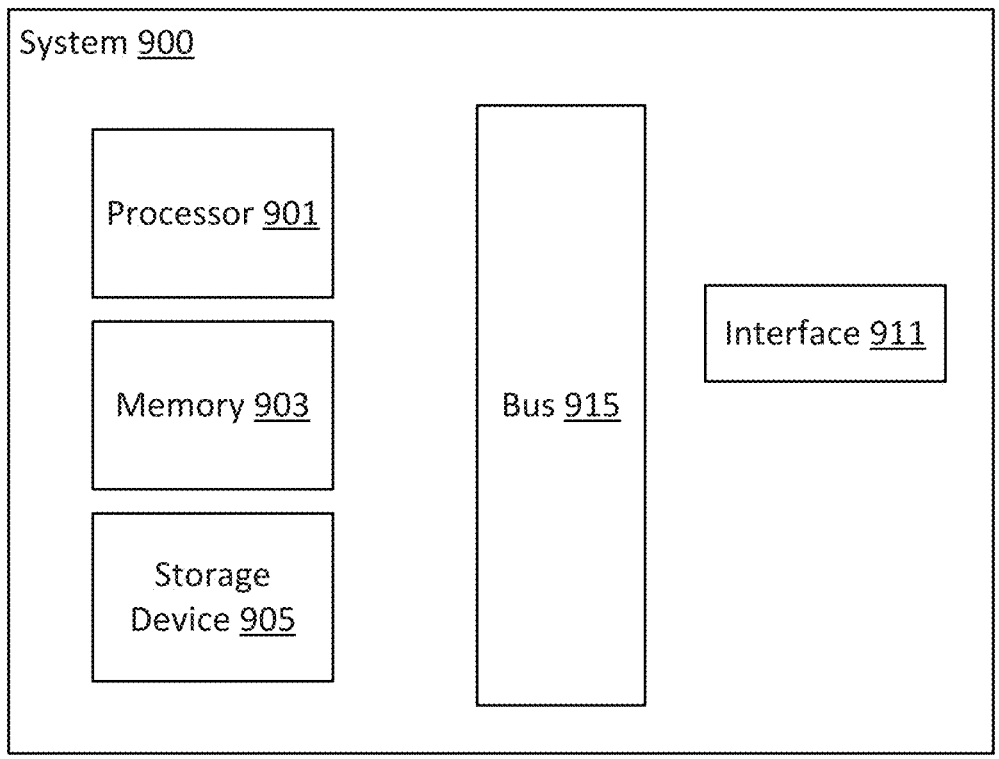
FIG. 9 illustrates an example of a computing device, configured in accordance with one or more embodiments.

FIG. 9 illustrates one example of a computing device. According to various embodiments, a system 900 suitable for implementing embodiments described herein includes a processor 901, a memory module 903, a storage device 905, an interface 911, and a bus 915 (e.g., a PCI bus or other interconnection fabric.) System 900 may operate as variety of devices such as an application server, a database server, or any other device or service described herein. Although a particular configuration is described, a variety of alternative configurations are possible. The processor 901 may perform operations such as those described herein. Instructions for performing such operations may be embodied in the memory 903, on one or more non-transitory computer readable media, or on some other storage device. Various specially configured devices can also be used in place of or in addition to the processor 901. The interface 911 may be configured to send and receive data packets over a network.

Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A system comprising:
   a framework database, the framework database comprising framework data associated with a first data visualization framework;
   a component database, the component database comprising component data associated with a first component and a second component, wherein the first component is configured to receive first data and provide a plurality of representations of the first data within a first portion of a visualization framework, wherein the second component is configured to receive the first data and provide a plurality of representations of the first data within a second portion of the visualization framework, wherein the first component and the second component are incorporated into the visualization framework as singular objects, wherein the first component is configured to allow a user to scroll through the plurality of representations of the data while incorporated into the visualization framework, wherein the first data visualization framework is configured to operate in a first runtime, wherein the first component is configured to operate in a second runtime nested within the first runtime, and wherein the second component is configured to operate in a third runtime nested within the first runtime; and
   a processor configured to perform operations comprising:
      receiving first user instruction for a first data visualization framework to incorporate the first component;
      receiving the first data;
      generating, with the first component and based on the first data, a first plurality of representations of the first data;
      transmitting the first plurality of representations of the first data to a first user device for incorporation within a first portion of the first data visualization framework as a first singular object;
      receiving second user instruction for the first data visualization framework to incorporate the second component;
      receiving, due to the nesting of the second runtime and the third runtime within the first runtime, the first data with the second component;
      generating, with the second component and based on the first data, a second plurality of representations; and
      transmitting the second plurality of representations to the first user device for incorporation within a second portion of the first data visualization framework as a second singular object.

2. The system of claim 1, wherein the operations further comprise:
   receiving, from a party associated with the first component, a modification of the first component;
   generating, based on the modification of the first component, an updated first plurality of representations of the first data; and
   transmitting the updated first plurality of representations of the first data to the first user device.

3. The system of claim 1, wherein the operations further comprise:
   receiving third user instruction for a second data visualization framework to incorporate the first component;
   receiving third data;
   generating, with the first component and based on the third data, a third plurality of representations of the third data; and
   transmitting the third plurality of representations of the third data to a second user device.

4. The system of claim 1, wherein the first component is configured to receive a first shape of data, and wherein the first data is of the first shape.

5. The system of claim 1, wherein the operations further comprise:
   determining a first characteristic of the first data, wherein the first plurality of representations of the first data is generated based on the first characteristic.

6. The system of claim 1, wherein the first component and the second component are configured to share data.

7. A method comprising:
   receiving, from a user, a request to provide a first component to a first data visualization framework;
   accessing a component database for the first component, wherein the component database comprises first data;
   transmitting the first component to a user device associated with the user, wherein the first component is configured to receive the first data and provide a plurality of representations of the first data within a first portion of the first data visualization framework, and wherein the first component is configured to allow a user to scroll through the plurality of representations of the first data while incorporated into the first data visualization framework;
   receiving from the user, a request to provide a second component to the first data visualization framework, wherein the first data visualization framework is configured to operate in a first runtime, wherein the first component is configured to operate in a second runtime nested within the first runtime, and wherein the second component is configured to operate in a third runtime nested within the first runtime;
   receiving, due to the nesting of the second runtime and the third runtime within the first runtime, the first data with the second component; and
   transmitting the second component to the user device, wherein the second component is configured to provide a plurality of representations of the first data within a second portion of the first data visualization framework, wherein the first component and the second component are incorporated into the first data visualization framework as singular objects.

8. The method of claim 7, further comprising:
   receiving, from a party associated with the first component, an update of the first component; and
   transmitting the updated first component to the user device.

9. The method of claim 7, wherein the first component is configured to receive a first shape of first data.

10. The method of claim 7, wherein the first component is configured to determine a first characteristic of the first data.

11. A non-transitory computer-readable medium comprising computer-readable program code capable of being executed by one or more processors, the program code comprising instructions configurable to cause operations comprising:
   providing, to a first user, a first component and a second component of a first data visualization framework, wherein the first data visualization framework is configured to operate in a first runtime, wherein the first component is configured to operate in a second runtime nested within the first runtime, and wherein the second component is configured to operate in a third runtime nested within the first runtime, wherein the first component is configured to receive first data and provide a plurality of representations of the first data within a portion of the first data visualization framework, wherein the second component is configured to receive, due to the nesting of the second runtime and the third runtime within the first runtime, the first data and provide a plurality of presentations of the first data within a second portion of the visualization framework, wherein the first component and the second component are incorporated into the first data visualization framework as singular objects, wherein the first component is configured to allow a user to scroll through the plurality of representations of the first data while incorporated into the first data visualization framework;

receiving, from a second user, an update to the first component; and transmitting, to the first user, the update to the first component, the update to the first component configured to update the plurality of representations of the first data.

12. The non-transitory computer-readable medium of claim 11, wherein the first component is configured to receive a first shape of first data.

13. The non-transitory computer-readable medium of claim 11, wherein the first component is configured to determine a first characteristic of the first data.

14. The non-transitory computer-readable medium of claim 11, wherein the first component is configured to share data with a second component incorporated into the first data visualization framework.

15. The non-transitory computer-readable medium of claim 13, wherein the plurality of representations of the first data is generated based on the first characteristic.

16. The method of claim 10, wherein the plurality of representations of the first data is generated based on the first characteristic.

17. The system of claim 1, wherein the framework database and the component database are separate.

18. The system of claim 1, wherein the operations further comprise:

providing the first data visualization framework to the first user device.

19. The method of claim 7, wherein the operations further comprise:

providing the first data visualization framework to the first user device.

20. The method of claim 18, wherein the first data visualization framework is stored within a framework database separate from the component database are separate.

* * * * *